H. B. FERNALD.
Car Truck.
No. 69,330.
2 Sheets—Sheet 1.
Patented Oct. 1, 1867.
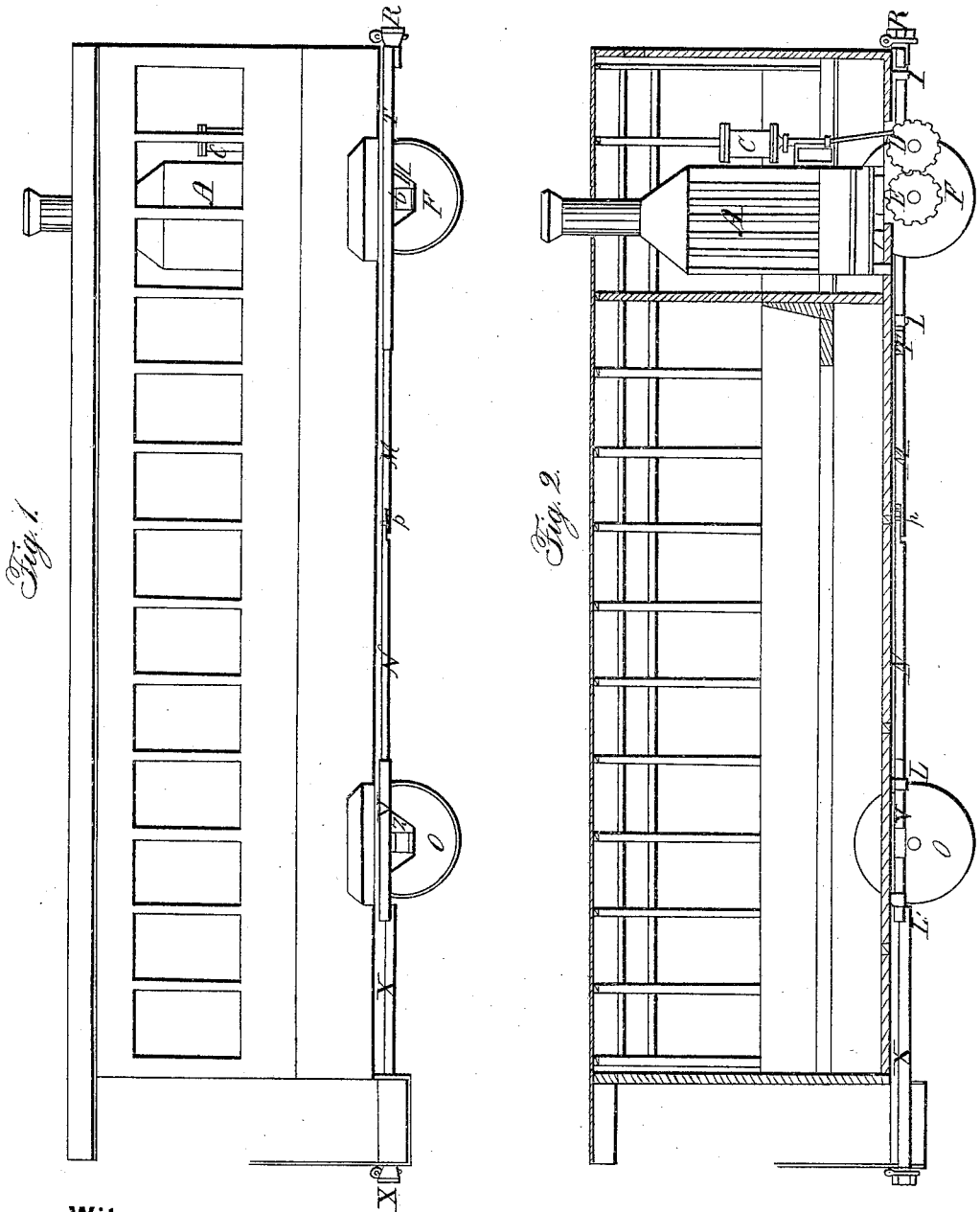
Witnesses:
Chas A Taylor
M. Moulden
Inventor:
Henry B. Fernald H. B. FERNALD.
Car Truck.
No. 69,330.
2 Sheets—Sheet 2.
Patented Oct. 1, 1867.
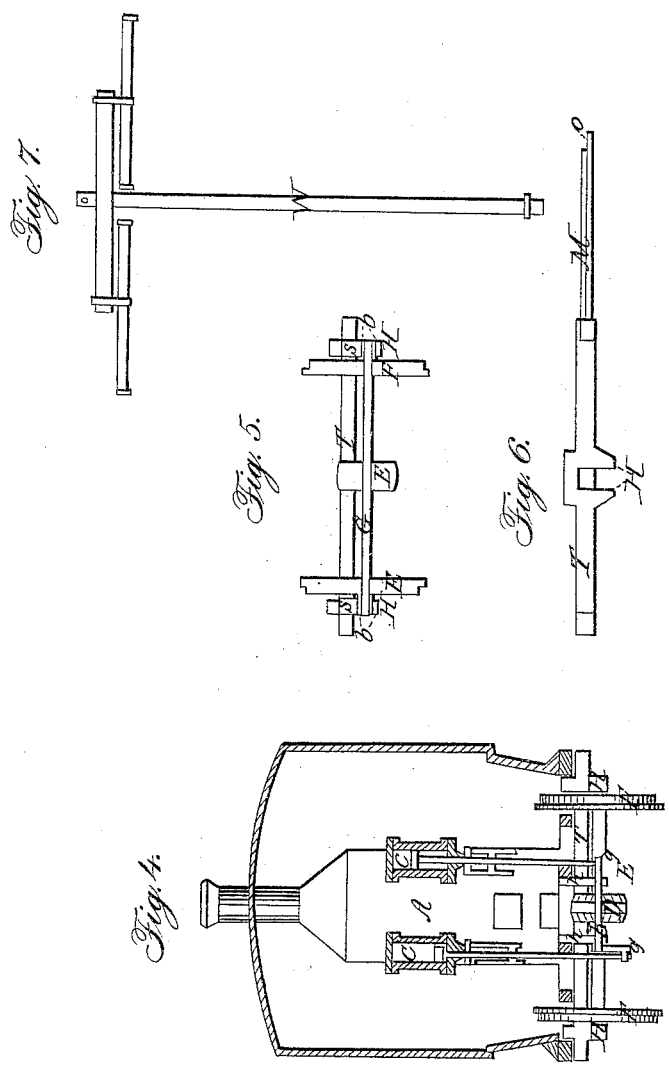
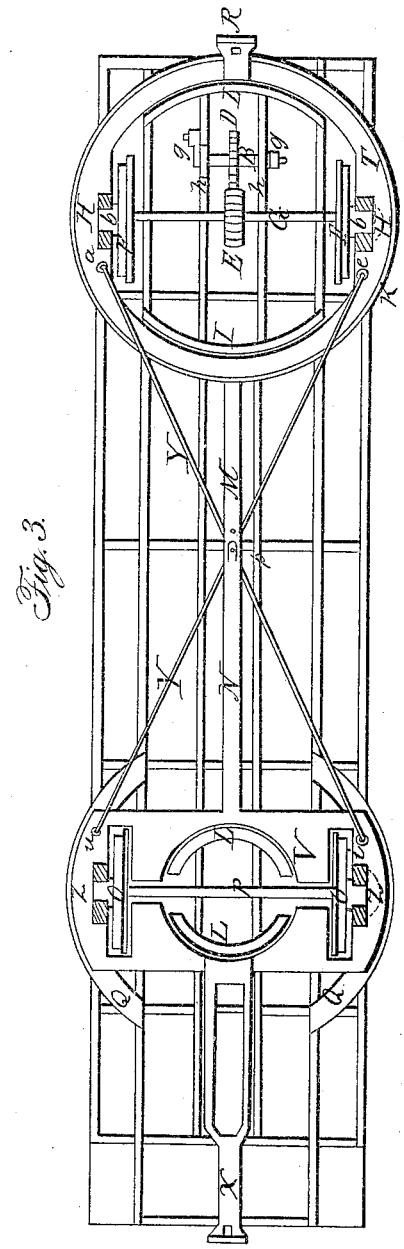
Witnesses:
Chas A Taylor
M. Moulden
Inventor:
Henry B Fernald

United States Patent Office.

HENRY B. FERNALD, OF DEDHAM, MASSACHUSETTS.

*Letters Patent No.* 69,330, *dated October* 1, 1867; *antedated September* 25, 1867.

IMPROVEMENT IN RAILWAY TRUCKS.

The Schedule referred to in these Letters Patent and making part of the same.

TO ALL WHOM IT MAY CONCERN:

Be it known that I, HENRY B. FERNALD, of Dedham, in the county of Norfolk, and State of Massachusetts, have invented a new and improved Mode of Constructing Cars for running on street and other railroads having short curves, whether propelled by steam or horse-power, of which I declare the following to be a full and exact description, reference being had to the accompanying drawings, which form a part of this specification.

I shall begin by describing the car as designed to be propelled by steam-power.

Figure 1 is a side elevation.

Figure 2, a longitudinal section.

Figure 3, a plan of the bottom, and

Figure 4 a transverse section of the car.

Figure 5 is a longitudinal, and

Figure 6 a transverse section of the forward truck thereof.

A is any ordinary boiler; C C, the cylinders, the piston-rods of which connect with the cranks $g\ g$ of the shaft B, which is suspended from the bottom of the car by the hangers $h\ h$. D, the driving-wheel on the shaft B, is a plain cog-wheel, and is geared to the cog-wheel E on the shaft G of the car-wheels F F. The front of the teeth of the wheel E is convex, rounded to a radius of the wheel, and this wheel may be made thicker than the driving-wheel D, so that as it turns with the movement of the truck T it shall continue in gear with the driving-wheel D. T is a movable circular truck, of cast iron or other suitable material, moving round the guides I I, which are attached under and with the bed-plate K to the bottom of the car. The hangers H H are cast in or otherwise made to form a part of the truck T. The tops of these hangers project above the top of the truck T to permit the openings for the springs S S and boxes $b\ b$ to be extended to the upper surface of the truck, or higher, if necessary. M is an arm or tongue, forming a part of the truck T, by being cast with or otherwise attached to it, and is provided with an opening, $o$, in the end. V is the rear truck, of the same material as the truck T, and is provided with the guides L L, the bed-plates Q Q, the hangers Z Z, and the tongue N, which has a pin, $p$, in the end, to move in the opening $o$ of the tongue M. Y Y are cross-rods, bent so as to cross each other without contact. The ends $a\ e$ are connected with truck T, and the opposite ends $i\ u$ with the truck V by pins or bolts, so put in as to allow freedom of movement to the rods.

Operation: When the car is upon a straight track, the axles of the car-wheels F F and O O will be parallel, and so remain until it arrives at a curve, when the wheels F F will commence turning on the curve, causing the truck T to move round its guides I I, which will cause the arm M to move to the right or left, as the case may be, and pressing upon the pin $p$ will move the arm N in the same direction, thus cause the truck V to move round its guides L L and bring the wheels O O into position for turning the curve. This motion of the truck T is also imparted by the cross-rods Y Y to the truck V.

Having described my said invention as adapted for a steam car, it will be readily seen that by dispensing with boiler A, the cylinders C C, the driving-wheel D, with its shaft B and hangers $h\ h$, and the convex cog-wheel E, it can be easily adapted to be drawn by horses, by the attaching of a proper socket, R, to the truck T, and another, X, to the truck V, for the reception of the pole W, fig. 7, to which the horses may be attached.

While the rear truck for the steam car may be made circular, like the truck T, when designed to be operated by horse-power the forward truck may be constructed like the truck V. I do not, therefore, propose to be confined to either form, but to use either or both, as may be most desirable. Neither do I propose to be confined to any particular form of boiler or cylinders, as I lay no claim to any improvement in them. I propose to use any of the ordinary friction-rollers, to prevent friction in the movement of the trucks under their bed-plates and around their guides. One or both cross-rods may be dispensed with when the tongues are used, and the tongues may be omitted when one or both cross-rods are employed, or all may be used, as may be desirable. The connection between the tongues M and N may be made by means of cogs instead of by the pin $p$ and opening $o$, and chains or even ropes may be substituted for the cross-rods Y Y, but the rods are preferable. It is apparent, also, that the truck T may be adapted when desirable for four car-wheels instead of for two, as herein described.

What I specifically claim as my invention, and desire to secure by Letters Patent, is—

1. The circular truck T, constructed as described, with hangers cast or fitted upon it, and extending above and below, substantially as set forth.

2. In combination with the above, the guides I I, the convex wheel E, and the drive-wheel D, constructed and arranged as set forth.

3. I claim, also, the truck V, with the hangers extending above and below, and provided with slotted openings for the wheels O O, a transverse opening to admit the axle, and a central circular opening, in combination with the guides L L, substantially as described and set forth.

HENRY B. FERNALD.

Witnesses:
   CHAS. N. TAYLOR,
   M. MOULDEN.